J. G. ZIMMERMAN.
COUPLING.
APPLICATION FILED JUNE 25, 1906.
931,173.
Patented Aug. 17, 1909.
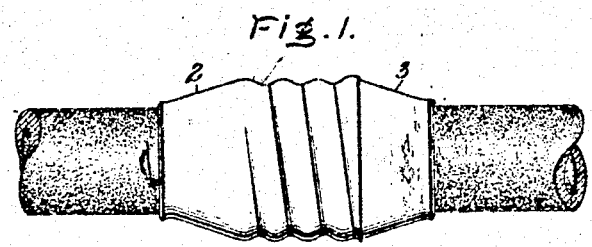
Fig. 1.
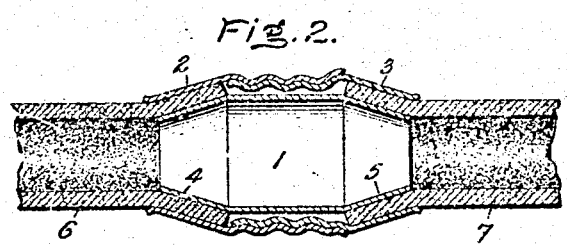
Fig. 2.
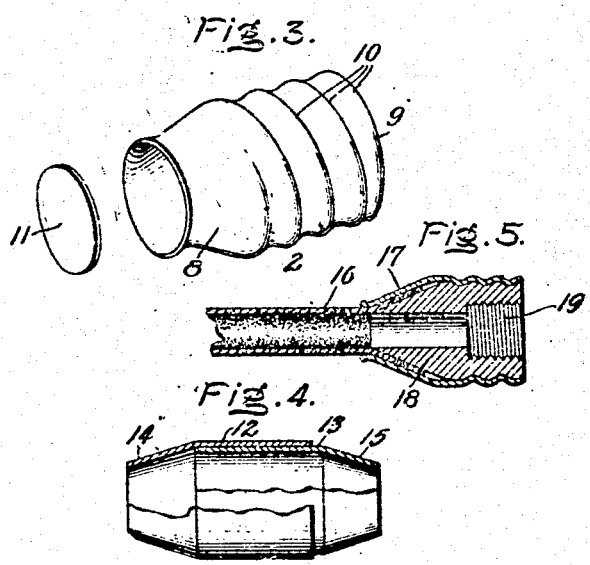
Fig. 3.
Fig. 5.
Fig. 4.
WITNESSES:
George A. Thornton
Burchard V. Kelley
INVENTOR:
James G. Zimmerman,
By Arba B. Marvin Jr.
Att'y.

UNITED STATES PATENT OFFICE.

JAMES G. ZIMMERMAN, OF MILWAUKEE, WISCONSIN.

COUPLING.

No. 931,173.　　　Specification of Letters Patent.　　Patented Aug. 17, 1909.

Application filed June 25, 1906. Serial No. 323,238.

*To all whom it may concern:*

Be it known that I, JAMES G. ZIMMERMAN, a citizen of the United States, residing at Milwaukee, county of Milwaukee, State of Wisconsin, have invented certain new and useful Improvements in Couplings, of which the following is a specification.

This invention relates to an improved form of coupling device suitable for use with rubber hose and other flexible tubing.

It comprises a sheet metal shell or cap which co-acts with a conical spreader to clamp the end of a flexible hose or tube and join it securely to a second tube and at the same time furnish an unrestricted channel for the passage of fluid through the tubes.

The details of my invention will be better understood by reference to the following description taken in connection with the accompanying drawing in which—

Figure 1 is an elevation of the coupling in place on the tubes; Fig. 2 is a section thereof; Fig. 3 is a perspective view of one of the swaged caps; Fig. 4 is a modified form of spreader, and Fig. 5 shows a modification.

The coupling shown in Fig. 2 comprises a tubular spreader 1 and two pressed metal caps 2 and 3. The spreader is preferably made of a single piece of metal and may be conveniently "spun" to shape from a tubular blank, as will be readily understood by persons skilled in the art. The spreader is provided with conical ends 4 and 5 which serve to spread out the flexible tubes 6 and 7, and form abutments against which the flexible tubing is crowded by the caps 2 and 3. The caps are of sheet metal and may be pressed or stamped into shape from blanks punched from a thin sheet. They may be of brass, steel or other resilient material, though when a coupling of especially light weight is desirable, as in automobile work, I may use aluminum.

Referring to Fig. 3, it will be seen that cap 2 consists of two distinct parts, a conical part 8 and a cylindrical part 9, the latter having a helical swage or thread 10 pressed therein. In the manufacture of these caps I follow ordinary methods of pressing or stamping sheet metal ware. A blank of suitable size is first pressed to a cup of the general shape of Fig. 3, after which the bottom 11 is punched out and the helical swage or thread is rolled in. If desired the swage may be pressed in with a special tool or may even be made during the first pressing or stamping operation. The spiral swage gives the cap strength and resilience throughout the cylindrical portion 9 and also serves as a means for engagement with the other cap 3. The un-swaged or conical portion 8 of the cap is more or less flexible and is thus able to fit tightly against the rubber hose 6 even though the latter may be irregular in thickness or may have its bore slightly out of center. The helical swages of the caps 2 and 3 serve as threads to join the caps together and thereby force the ends of the tubes 6 and 7 up against the conical ends 4 and 5 of spreader 1.

Fig. 4 shows partly in section, a modified form of spreader consisting of two stamped metal tubes 12 and 13 provided with conical abutments 14 and 15. This spreader may, if desired, be substituted for the unitary spreader shown in Fig. 2. The coupling is strong and easily applied and at the same time is light in weight and easy to manufacture. Owing to the resilience of the caps I am able to connect and disconnect the coupling by hand without a wrench or tool of any kind. This is often a great convenience, as when the coupling is used on automobiles. The resilience of the caps and the size and shape of the helical swage prevent the caps from "jamming" or wedging together as is common with couplings of cast metal having ordinary screw threads; and furthermore the tenacious grip of the caps on each other prevent them from jarring loose when subjected to vibration.

The modification shown in Fig. 5 is adapted for use where a connection is desired between a flexible hose and a rigid metal tube. Such a connection is sometimes necessary in joining the radiator of an automobile with its engine and pump.

As shown in the drawing, the flexible hose 16 is clamped between the sheet metal cap 17 and the conical spreader 18, and the cap 17 has a spiral swage forming a thread which interlocks with a similar thread on the spreader 18. The central bore of the spreader is provided with screw threads 19 of proper pitch to engage with the threaded end of an iron pipe of ordinary type. The central bore of the coupling is preferably made as large or larger than the bore of the flexible tubing.

My improved coupling is adapted not only for high and moderate pressure hose and tubing of ordinary size and material but may also be advantageously used in small sizes for connecting up pneumatic pumps, syringe tubes and other apparatus, with which a strong, light and hand operative coupling is desirable.

What I claim as new and desire to secure by Letters Patent of the United States, is:

1. A hose coupling, comprising a resilient sheet metal spreader having a cylindrical center portion with a bore larger than that of the hose to be coupled, and having conical ends integral therewith and forming abutments for the hose ends, and a plurality of pressed sheet metal caps each having a resilient conical portion for holding a hose end against one of said abutments, said caps having cylindrical portions with shallow helical swages of rounded outline pressed therein which interlock to hold said caps in position.

2. In a hose coupling, the combination of a spreader having a cylindrical center portion with a bore at least as large as that of the hose to be coupled, and having a conical end forming an abutment, and a sheet metal cap having a conical portion for holding a tube end against said abutment, said conical portion being resilient, the said cap also having a cylindrical portion with a shallow helical swage of rounded outline pressed therein.

In witness whereof, I have hereunto set my hand this 15th day of June, 1906.

JAMES G. ZIMMERMAN.

Witnesses:
A. V. THOMAS.
ADOLPH H. ROETHKE.